United States Patent [19]

Koorevaar

[11] 4,379,104

[45] Apr. 5, 1983

[54] METHOD AND DEVICE FOR MOULDING A TIRE FOR A WHEEL RIM

[76] Inventor: Arie Koorevaar, 630 Rivierdijk, 3371 EE Hardinxveld-Giessendam, Netherlands

[21] Appl. No.: 243,872

[22] Filed: Mar. 16, 1981

[30] Foreign Application Priority Data

Mar. 21, 1980 [NL] Netherlands ..................... 8001681

[51] Int. Cl.³ ............................................. B29D 27/00
[52] U.S. Cl. .................................. 264/45.5; 264/45.7;
264/46.4; 264/46.9; 264/271.1; 264/274;
264/275; 264/311; 264/328.3; 264/DIG. 83;
425/34 R; 425/35; 425/40; 425/543; 425/552;
425/576
[58] Field of Search ............. 264/46.9, 46.5, DIG. 83,
264/46.4, 46.7, 45.7, 45.5, 54, 271.1, 274, 275,
311, 328.3; 425/34 R, 35, 40, 543, 552, 576

[56] References Cited

U.S. PATENT DOCUMENTS

| | | | |
|---|---|---|---|
| 1,336,139 | 4/1920 | Hofmeister | 264/46.7 X |
| 2,273,283 | 2/1942 | Pfeiffer . | |
| 2,838,100 | 6/1958 | Follows | 264/46.7 X |
| 2,921,344 | 1/1960 | Carrico | 264/46.9 X |
| 2,958,907 | 11/1960 | Mumford et al. | 264/45.7 |
| 3,052,927 | 9/1962 | Hoppe et al. | 264/45.7 |
| 3,129,270 | 4/1964 | Hood | 264/54 |
| 3,147,975 | 9/1964 | Gruss et al. | 264/45.5 X |
| 3,331,423 | 7/1967 | Guin | 264/45.7 X |
| 3,396,773 | 8/1968 | Alderfer | 264/451.7 X |
| 3,511,736 | 5/1970 | Nielsen, Jr. et al. | 264/46.9 X |
| 3,579,727 | 5/1971 | Schwenk et al. | 264/DIG. 83 |
| 3,746,387 | 7/1973 | Schwenk | 264/46.4 X |
| 3,789,094 | 1/1974 | Hutchison | 264/46.5 |
| 3,794,706 | 2/1974 | Christie et al. | 264/46.9 X |
| 3,807,474 | 4/1974 | Wendt et al. | 301/111 X |
| 3,810,620 | 5/1974 | Decker et al. | 264/46.7 X |
| 3,928,106 | 12/1975 | Molnar | 264/DIG. 83 |
| 3,931,381 | 1/1976 | Lindberg | 264/45.5 |
| 3,971,837 | 7/1976 | Hasegawa et al. | 264/46.7 X |
| 4,060,578 | 11/1977 | Kisbany | 264/46.6 |
| 4,082,825 | 4/1978 | Puterbaugh | 264/46.5 |
| 4,153,657 | 5/1979 | Wilcox | 264/DIG. 83 |
| 4,154,784 | 5/1979 | Ruhl | 264/45.5 |

FOREIGN PATENT DOCUMENTS

| | | |
|---|---|---|
| 1462055 | 12/1966 | France . |
| 1470691 | 2/1967 | France . |
| 2039159 | 1/1971 | France . |
| 2413983 | 8/1979 | France . |
| 574683 | 3/1958 | Italy ............................... 264/46.4 |
| 47-49186 | 11/1972 | Japan ............................. 264/46.7 |
| 7604807 | 5/1976 | Netherlands . |
| 7709894 | 9/1977 | Netherlands . |

OTHER PUBLICATIONS

Mobay Chemical Corp. Bulletin: "Baydur Polyurethane Structural Foam", Pittsburgh, Pa., Mobay Chemical Corp., Polyurethane Division, c 1975, 16 pp.

*Primary Examiner*—Philip E. Anderson
*Attorney, Agent, or Firm*—Diller, Ramik & Wight

[57] ABSTRACT

The invention relates to a method of moulding a tire for a wheel rim by means of a mould having mould parts, said mould parts being movable between a closed working position in which they enclose a mould cavity with the shape of the tire and an open position in which said mould parts are spaced apart, wherein in the open position of the mould parts a hollow tire core is positioned in the mould cavity while being receivable with respect to said parts, wherein the mould parts are moved into the working position, in which a residual cavity not occupied by the tire core is left free in the mould cavity, said residual cavity. Preferably the tire core is arranged on the wheel rim before being positioned with respect to the mould parts. The invention also provides a device for moulding a tire and a tire obtained with the aid of the method and device.

12 Claims, 7 Drawing Figures

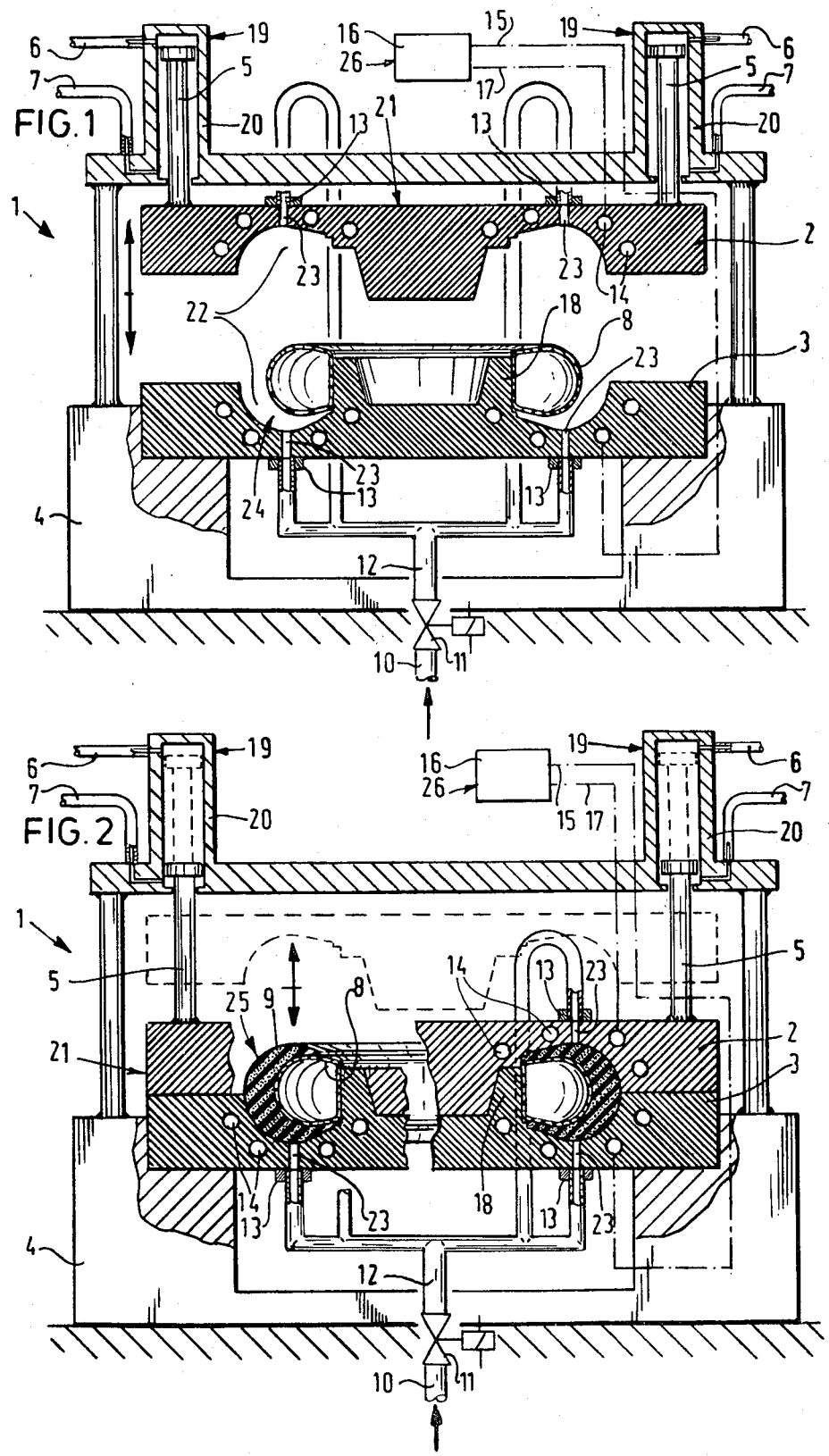

FIG. 5
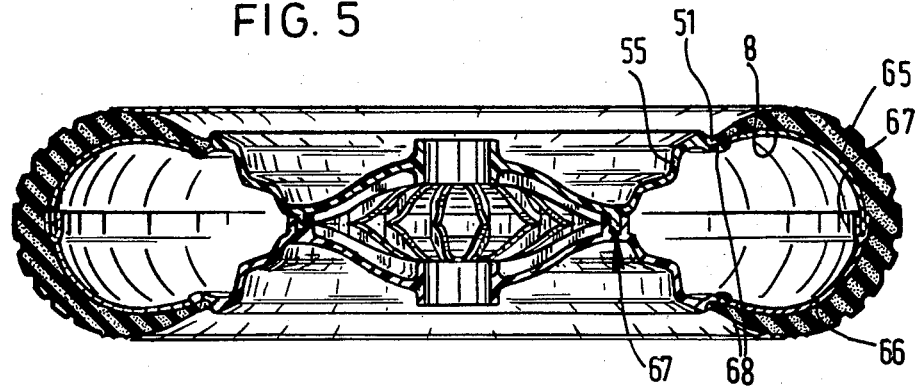
FIG. 6
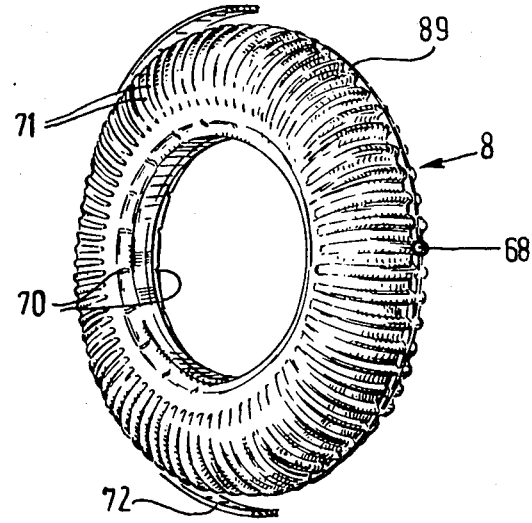
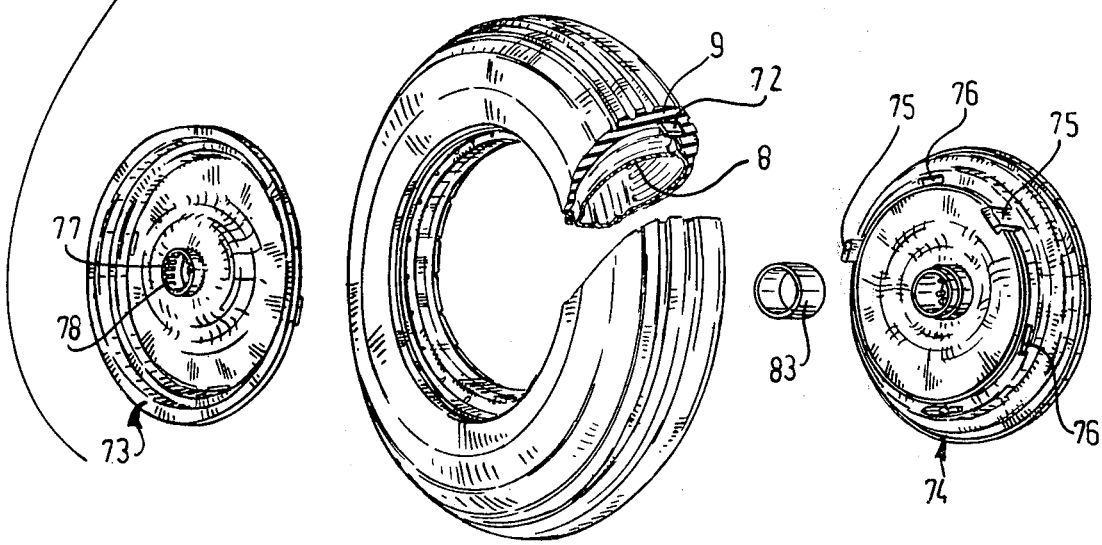

METHOD AND DEVICE FOR MOULDING A TIRE FOR A WHEEL RIM

The invention relates to a method of moulding a tire for a wheel rim by means of a mould having mould parts, said mould parts being movable between a closed working position in which they enclose a mould cavity with the shape of the tire and an open position in which said mould parts are spaced apart.

It is known to manufacture pneumatic rubber tires by such a method. Pneumatic tires have the disadvantage that they may become punctured and will first have to be repaired before being usable again. Moreover, these tires are costly. However, owing to the excellent resilience these tires are still in common use.

The invention has for its object to provide a method of moulding a tire, particularly a tire for low speeds, for example, for use on a wheel-barrow or a tire for a transport vehicle, which tire cannot become punctured and can be manufactured at low cost, whilst maintaining satisfactory resilience.

This is achieved by the following successive steps: in the open position of the mould parts positioning a hollow tire core with respect to said parts receivably in the mould cavity; moving the mould parts into the working position in which a residual cavity not occupied by the tire core is left free in the mould cavity; foaming up the residual cavity with synthetic resin foam.

By using an appropriate recipe of synthetic foam the desired resilience of the tire can be obtained. The tire core according to the invention occupies a large part of the tire volume so that for each tire only a small amount of synthetic foam is used and accordingly the costs of a tire manufactured by the method according to the invention are low.

If the mould according to the invention is rotated about a rotation-symmetrical axis of the mould cavity the synthetic foam is well and uniformly distributed.

At the surface of the tire a hard, wear-resistant layer can be formed by cooling at least one of the mould parts in accordance with the invention. In particular, those mould parts are cooled which form the surface of the tire. Synthetic foam has the property that foam is formed only above a specific temperature. By cooling the wall of the mould cavity locally at the wall no foam is formed so that at this place the desired hard, wear-resistant layer with higher density is formed. The thickness of the wear-resistant layer can be varied by controlling the degree of cooling.

During the moulding process the tire is intimately fitted to the rim so that a robust wheel is obtained if prior to positioning the tire core with respect to the mould parts, the tire core is arranged on the rim and the rim is received in recesses in the mould parts closing around the rim.

The invention relates furthermore to and provides a device for moulding a tire for use on a wheel rim, comprising a frame, guide means connected with said frame, mould parts movably guided relatively to one another in said guide means and locking means engaging the mould parts for moving the mould parts between an open position in which the mould parts are spaced apart and a closed, working position in which they enclose a mould cavity with the form of the tire.

Said device is characterized by retaining means for retaining a tire core receivably in the mould cavity in the open position of the mould parts, and by means for feeding foam-building material to the mould cavity.

The invention furthermore relates to and provides a tire for use on a wheel rim, said tire being characterized in that it comprises a hollow tire core and a tire body of synthetic foam.

Further features of the invention will be apparent from the following description with reference to illustrated embodiments of the device according to the invention.

FIG. 1 is a sectional view of a device in accordance with the invention in which the mould parts are shown in the open position.

FIG. 2 is a sectional view of the device of FIG. 1, some parts being broken away, the mould parts being in the closed working position.

Figure 3:
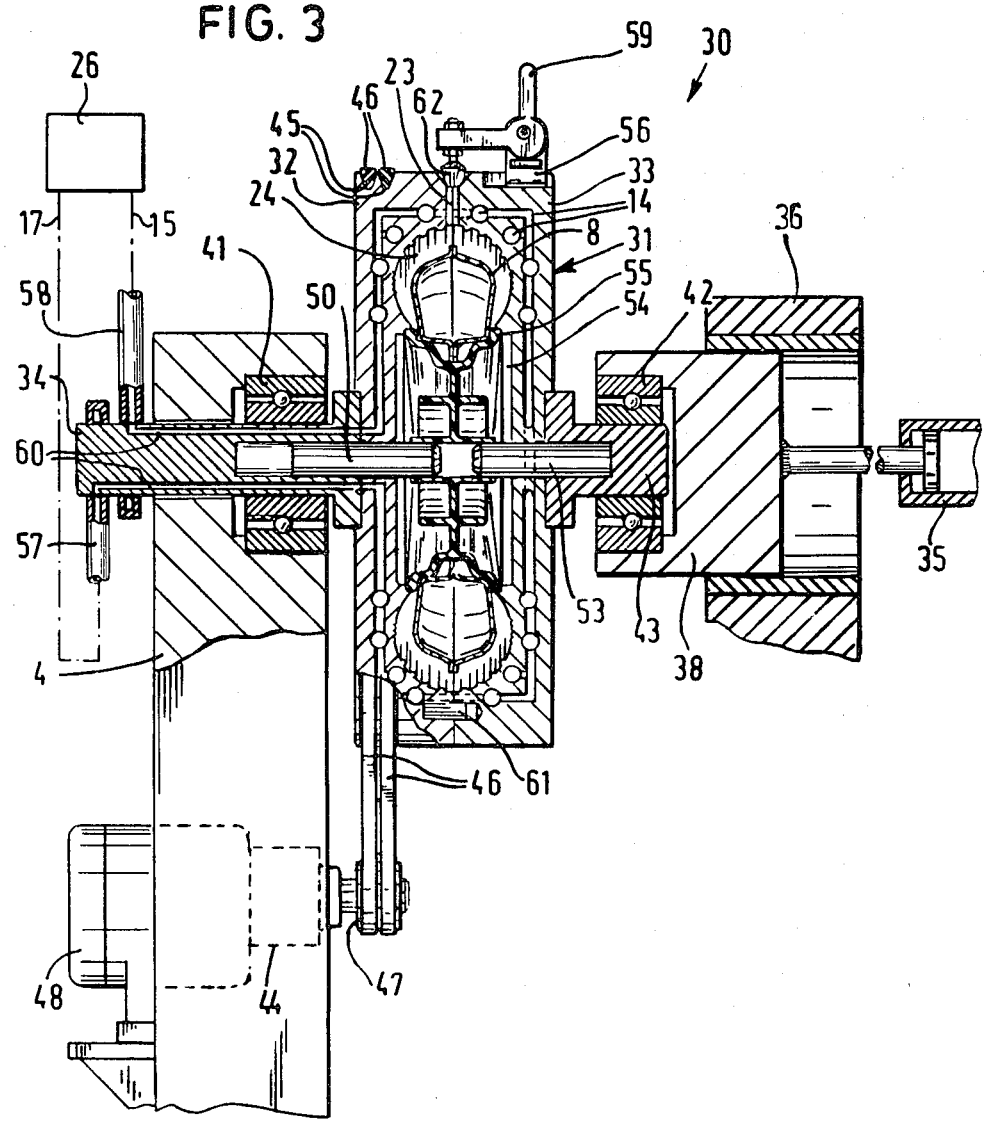

FIG. 3 schematically shows a preferred embodiment of the device.

Figure 4:
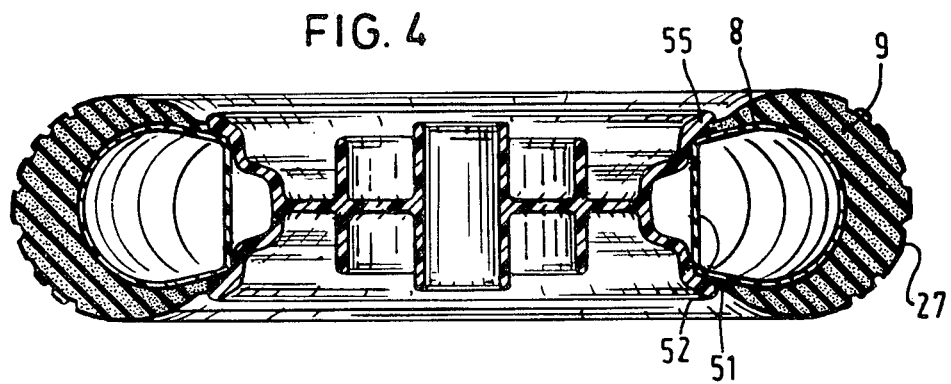

FIG. 4 is a sectional view of a tire according to the invention on a wheel rim.

FIG. 5 shows a further embodiment of a tire in accordance with the invention.

FIG. 6 shows a preferred embodiment of a tire in accordance with the invention.

Figure 7:
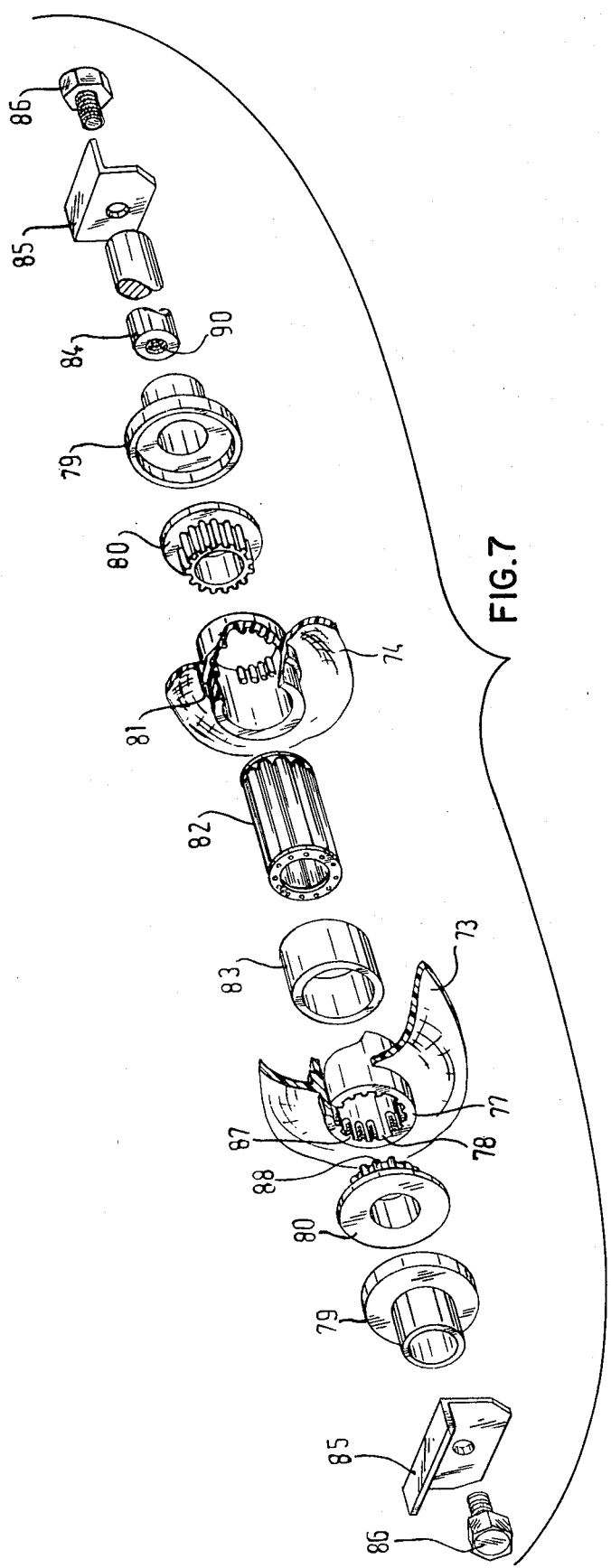

FIG. 7 is an exploded view of the bearing of the wheel shown in FIG. 6.

The device 1 according to the invention comprises a frame 4 and a mould 21 formed by mould parts 2,3. The mould part 3 is fixedly mounted in the frame 4. The mould part 2 is connected with piston rods 5 of linear motors 19. By introducing a pressure medium through the conduits 6 into the cylinders 20 of the motors 19 the mould part 2 moves towards the mould part 3 out of the open position shown in FIG. 1 into the working position of the mould 21 shown in FIG. 2. By feeding pressure medium through the conduits 7 to the cylinders 20 the mould part 2 is again moved upwards into the position shown in FIG. 1.

The mould parts 2, 3 have recesses 22, which in the working position of the mould 21 define a mould cavity for a tire, for example, a wheel-barrow tire. The stationary mould part 3 has, moreover, an upwardly extending rim 18 forming retaining means around which a tire core 8 can be arranged in the open position of the mould 21.

The tire core 8 has a toroidal shape of D-shaped section, which is clearly shown in the Figures. The tire core 8 may be manufactured by a blowing technique from a synthetic material such as polyethylene or polypropylene.

When the tire core 8 is arranged in the mould part 3 around the rim 18, the mould 21 is closed by means of the linear motors 19. In the closed working position of the mould 21 the tire core 8 still leaves part of the mould cavity 24 formed by the recesses 22 unoccupied. In this part a tire body 9 is formed around the tire core 8 by introducing synthetic foam building material into the mould cavity 24 through the duct 10, the closing member 11 and the manifold 12 communicating through couplings 13 with ducts 23 communicating with the mould cavity 24. By chemical reaction said material produces synthetic resin foam which fills up the entire part of the mould cavity 24 left free by the tire core 8, thus forming the tire body 9.

When the synthetic foam reaction has died out, the mould part 2 is elevated by the linear motors 19 into the open position of the mould 21 and the moulded tire 25 is taken out of the mould 21.

As a synthetic resin foam polyurethane foam is preferred because by correct choice of the recipe it can obtain the desired characteristics relative to resilience and wear-resistance.

The device 1 of FIGS. 1 and 2 schematically shows a cooling device 26 comprising a cooling reservoir 16 for a coolant and inlet and outlet conduits 15, 17 communicating with cooling ducts 14 in the mould parts 2, 3. According to the invention the wall of the mould cavity 24 is cooled by means of said cooling device 26 to below a minimum temperature, at which foam is still formed by the foam-building material. This results in a hard, non-foam, wear-resistant layer 27 at the outer surface of the tire. The thickness of the wear-resistant layer 27 may be varied by varying the degree of cooling.

The device 30 schematically shown in FIG. 3 is a preferred embodiment of the invention. The axially movable mould part 33 of the mould 31 is fixed to a stub shaft 43 journalled in a sliding member 38 by means of a bearing 42. The sliding member 38 is axially slidable in the frame part 36. The sliding member 38 with the movable mould part 33 can be moved to the right by means of the linear motor 35 out of the closed position shown in FIG. 3 into the open position so that the mould parts 32, 33 are spaced apart. After positioning of a tire core in the mould 31 or after removal of a ready tire therefrom, the motor 35 moves the sliding member 38 with the mould part 33 back into the closed position. The axially stationary mould part 32 is rotatably connected with the frame 4 by means of a shaft 34 journalled by a bearing 41 in the frame 4. The stationary mould part 32 has grooves 45 engaged by V-belts 46 of a belt driving mechanism 44. The belt driving mechanism 44 comprises furthermore a motor 48 connected with the frame 4, a V-belt pulley 47 being coupled with the shaft of said motor.

According to the invention the mould parts 32 and 33 have recesses 54 and centering pins 50, 53 for a rim 55 so that the tire core 8 can be placed in the mould 31 while being arranged on a rim 55. When the rim 55 with the tire core 8 is positioned in the mould 31, the mould parts 32 and 33 are closed, whilst the centering pins 50, 53 ensure centering of the mould parts and the rim 55. The mould parts further have centering pins 61.

In the closed position, foam-building material are then introduced into the mould cavity 24 through the duct 23. After that the duct 23 is closed by a plug 62, the motor 48 of the driving mechanism 44 is switched on and the mould 31 is caused to rotate. The plug 62 is held in the closed position by a clamp lever 59 pivotally connected with a support 56 arranged on the mould 31. The supply of foam-building material may, as an alternative, take place through ducts provided in the shaft 34 and leading to the mould cavity 24. In this device 30 the cooling system 26 also comprises couplings 57, 58 allowing rotation, for the supply and discharge of coolant to and from the mould 31.

By centrifugally casting the foam-building material in this way, a good distribution and hence a uniform structure of the synthetic resin foam forming the tire body 9 is obtained.

By positioning the rim 55 with the tyre core 8 arranged on it in the mould, the tire body 9 can adhere not only to the tire core 8 but also to the rim 55 at the area of the tire heel 51 (see FIG. 4). When the material is selected so that the foam does not adhere to the rim, an intimate contact between the tire and the rim is obtained in any case so that a strong wheel is obtained.

Although the Figures show the tire core 8 in a closed form, it may have an open form without bottom 52. This has the advantage that the tire or the tire core 8 alone can be readily arranged on the rim 55.

FIG. 5 shows an embodiment of the invention in which the rim 55 with the tire core 8 comprises two parts 65,66, which are interconnected by coupling members 67 in a plane of symmetry at right angles to the axis of rotation—symmetry. Instead of a connection by means of coupling members 67, the parts 65,66 may be welded to one another, for example, by a mirror welding method. FIG. 6 shows that openings 68 are provided near the tire heel 51 in the tire core 8. These openings serve to allow the expeled air and the excess foam to escape during the manufacture of the tire body 9.

The embodiment of a wheel according to the invention shown in FIG. 6 comprises a tire core 8 having ridges 71. The tire core 8 is preferably made from polypropylene by a blow-forming method. In this way the tire core 8 has an inlet opening 68, which functions in the same manner as the openings 68 of the embodiment of FIG. 5. If desired, a filter of sufficiently fine mesh material may be provided in the opening 68 so that only gases and no foam material can pass. On the inner circumference the tire core 8 has ducts 70, which conduct air away out of the mould cavity of the mould.

The rim of the preferred embodiment of the wheel according to the invention comprises two identical rim halves 73, 74 provided on the proximal surfaces with a number—in this case three—of equidistant tags 75 with lugs and with the same number of equidistant holes 76 in off-set position relative to the tags. FIG. 7 shows more in detail that the hub bushings 77 of the rim halves 73, 74 are internally provided with a plurality of guard lugs 87 adapted to co-operate with guard lugs 88 of washers 80. A number of lugs 87 corresponding with the number of tags 75 and holes 76 is omitted from the hub 77. Centering lugs of a mounting device can be inserted into the hub where the guard lugs 87 are omitted. On this mounting device the two rim halves 73, 74 can be joined to one another enclosing a tire core 8. Owing to the centering apertures formed by the omitted guard lugs 87, the tags 75 of one rim half will lie exactly opposite the holes 76 of the other rim half. By strongly pressing these rim halves 73, 74 against one another in the mounting device, the lugs of the tags 75 are urged through the holes 76 so that a firm connection is established. The resultant combination of rim and tire core 8 can subsequently be introduced into a mould to form a tire body 9. Before the rim halves 73, 74 are joined on the mounting device a needle bearing 82 is inserted into one of the hub bushings 77 and a ring 83 is arranged on the inner side of the rim half around the hub sleeve. The ring 83 bears, in the mounted state, on shoulders 81 and thus seals the joint between the two hub bearings 77. The ring 83 thus prevents grease from flowing out of the bearing 82 between the hub bushings 77.

Since the tire core 8 is manufactured by a blow-forming method, a ridge 89 is formed on the outer periphery. The ridge 89 provides a reinforcement in the area of the most heavily loaded part of the tire core. If necessary, an additionally thickened ridge may be formed or an annular strip 72 may be arranged around the tire core 8 before it is positioned in the mould. The ridges 71 on the tire core 8 provide a good depressibility of the tire core with respect to a tire core having a smooth outer surface, whilst also material is saved. Since during the formation of the tire body 9 in the mould there will prevail no pressure difference between the exterior and the interior of the tire core owing to the openings 68, the tire core 8 will not expand when the mould is opened and hence the ridges 71 will not become visible in the outer surface of the tire body 9.

FIG. 7 furthermore shows the composition of the hub of the wheel according to the invention. On the outer side of the hub bushings 77 washers 80 are provided, onto which caps 79 are slipped. Through the assembly thus obtained a shaft 84 is passed, by which the wheel can be mounted between supports 85 of a vehicle by means of bolts 86 mounted into screw-threaded holes 90 at the ends.

According to the load conditions of the wheel and the speed of rotation in operation the bearing may have a different construction. The preferred embodiment shown, particularly relates to a wheel for low speeds. The invention may, however, also be applied to the manufacture of wheels having to operate with a higher rotary speed.

What I claim is:

1. The method of making a tire which comprises the steps of:
   (a) providing an annular mold cavity which is of generally crescent shape in radial cross section by enclosing with abutment of the cavity defined rim portion a thin walled annular core between mold halves which define a toroidal space therebetween, said core being formed of synthetic resinous material;
   (b) introducing foamable synthetic resinous material into said mold cavity in amount sufficient to fill said cavity completely when such material has foamed;
   (c) foaming such material to form a tire comprising the annular, thin walled core having an annular covering of foamed, synthetic resinous material of generally crescent-shaped radial cross section thereon; and
   (d) removing said tire from the mold halves.

2. The method as defined in claim 1 which includes the step of providing said core in the form of a hollow annulus.

3. The method as defined in claim 1 or 2 including the step of providing the core with corrugations defining ribs which extend radially with respect to the annular configuration thereof.

4. The method as defined in claim 1 including the step of mounting said core on a wheel prior to step (a).

5. The method as defined in claim 4 which includes the step of providing said core in the form of a hollow annulus.

6. The method as defined in claim 4 or 5 including the step of providing the core with corrugations defining ribs which extend radially with respect to the annular configuration thereof.

7. The method as defined in claim 1 including the step of providing a wheel in separate halves defining a rim portion and wherein the core is mounted on said rim portion of the wheel by snap-fitting said wheel halves together through the center of said core.

8. The method as defined in claim 7 which includes the step of providing said core in the form of a hollow annulus.

9. The method as defined in claim 7 or 8 including the step of providing the core with corrugations defining ribs which extend radially with respect to the annular configuration thereof.

10. The method as defined in claim 15 including the step of rotating the mold halves during step (c) to subject the foaming material to centrifugal force.

11. The method as defined in claim 1, 2, 4, 5, 7, 8 or 10 which includes the step of cooling said mold halves during step (c) whereby to form a hard, non-foamed and wear-resistance layer at the outer surface of the foamed material constituting the tire body.

12. The method as defined in claim 11 including the step of providing the core with corrugations defining ribs which extend radially with respect to the annular configuration thereof.

* * * * *